(12) United States Patent
Liebelt et al.

(10) Patent No.: US 10,795,624 B2
(45) Date of Patent: Oct. 6, 2020

(54) PRINT WORKFLOW VISUALIZATION AND COMPARISON

(71) Applicants: Linda Sue Liebelt, Boulder, CO (US); Jason Robert Nielsen, Longmont, CO (US); Dwight R. Palmer, Las Vegas, NM (US); Marquis G. Waller, Beverly, OH (US)

(72) Inventors: Linda Sue Liebelt, Boulder, CO (US); Jason Robert Nielsen, Longmont, CO (US); Dwight R. Palmer, Las Vegas, NM (US); Marquis G. Waller, Beverly, OH (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/909,068

(22) Filed: Mar. 1, 2018

(65) Prior Publication Data

US 2019/0272133 A1  Sep. 5, 2019

(51) Int. Cl.
*G06F 3/12* (2006.01)

(52) U.S. Cl.
CPC .......... *G06F 3/1256* (2013.01); *G06F 3/1241* (2013.01); *G06F 3/1244* (2013.01); *G06F 3/1257* (2013.01); *G06F 3/1262* (2013.01)

(58) Field of Classification Search
CPC .................................................. G06F 3/1256
See application file for complete search history.

(56) References Cited

U.S. PATENT DOCUMENTS

| | | | |
|---|---|---|---|
| 7,519,917 B2 | 4/2009 | Lewis-Bowen et al. | |
| 9,207,887 B1 * | 12/2015 | Lahey | G06F 3/1208 |
| 9,274,782 B2 * | 3/2016 | Adderly | G06Q 10/06 |
| 2006/0044597 A1 * | 3/2006 | Dumitrescu | H04N 1/00477 358/1.15 |
| 2009/0249187 A1 | 10/2009 | Morris et al. | |
| 2010/0011302 A1 | 1/2010 | Stein et al. | |
| 2010/0153132 A1 | 6/2010 | Barth et al. | |
| 2012/0116836 A1 * | 5/2012 | Flores | G06Q 10/0633 705/7.27 |
| 2013/0311927 A1 * | 11/2013 | Grossman | G06Q 10/10 715/771 |
| 2014/0129285 A1 * | 5/2014 | Wu | G06Q 10/0633 705/7.27 |
| 2014/0180711 A1 * | 6/2014 | Kamen | G06Q 10/06 705/2 |
| 2015/0088815 A1 * | 3/2015 | Billapati | G06F 16/21 707/609 |
| 2016/0026959 A1 | 1/2016 | Leber | |

(Continued)

FOREIGN PATENT DOCUMENTS

DE   10252576   12/2004

OTHER PUBLICATIONS

Nicholas Kong et al; Delta: A Tool for Representing and Comparing Workflows; CHI 2012, May 5-10, Austin, TX.

*Primary Examiner* — Benjamin O Dulaney
(74) *Attorney, Agent, or Firm* — Duft & Bornsen, PC

(57) ABSTRACT

Methods and systems disclosed provide for visually displaying a graphical representation of two or more print workflows to a user with a Graphical User Interface (GUI), analyzing the two or more print workflows to determine the differences between them, and visually displays the differences to the user with the GUI.

21 Claims, 14 Drawing Sheets

(56) References Cited

U.S. PATENT DOCUMENTS

| | | | | |
|---|---|---|---|---|
| 2016/0188769 A1* | 6/2016 | Aylott | .................... | G09B 25/02 |
| | | | | 703/6 |
| 2017/0154169 A1* | 6/2017 | Paschke | ................ | G16C 20/20 |
| 2017/0364843 A1* | 12/2017 | Haligowski | ........ | G06Q 10/0633 |
| 2018/0182136 A1* | 6/2018 | Zeyl | ..................... | G06T 11/206 |

* cited by examiner

FIG. 4
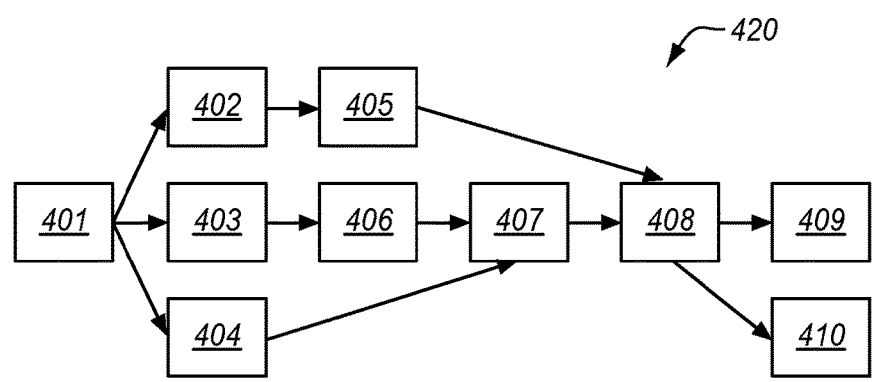
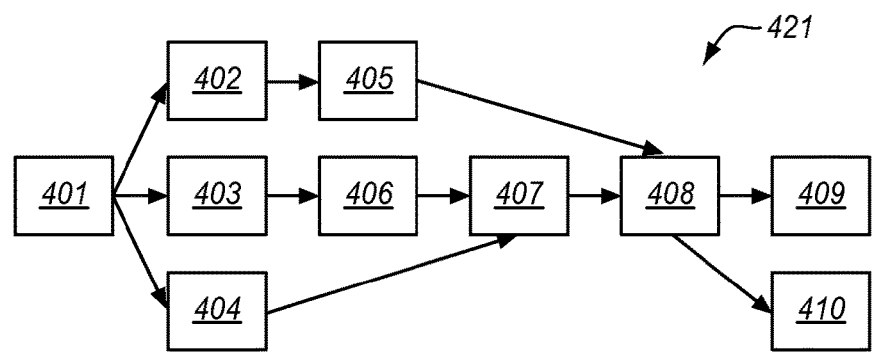
GUI
124

FIG. 6
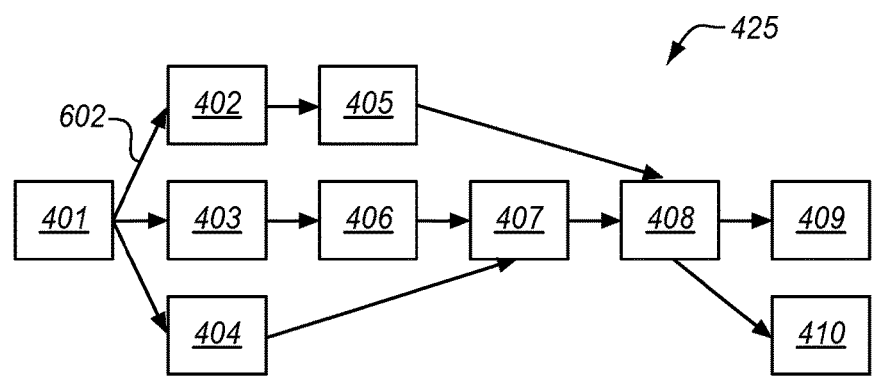
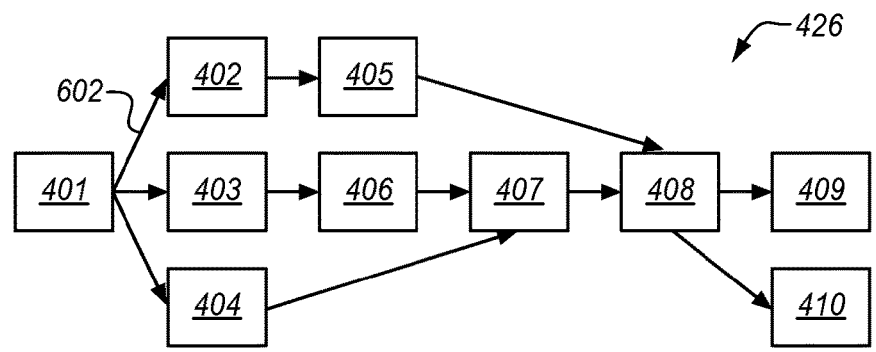
GUI
124

FIG. 8
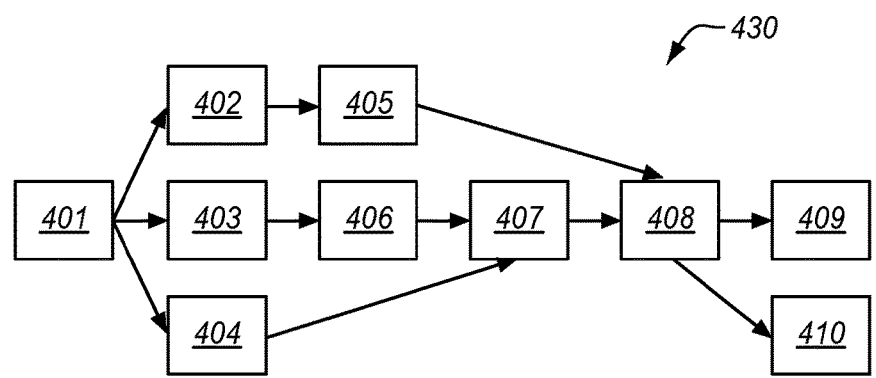
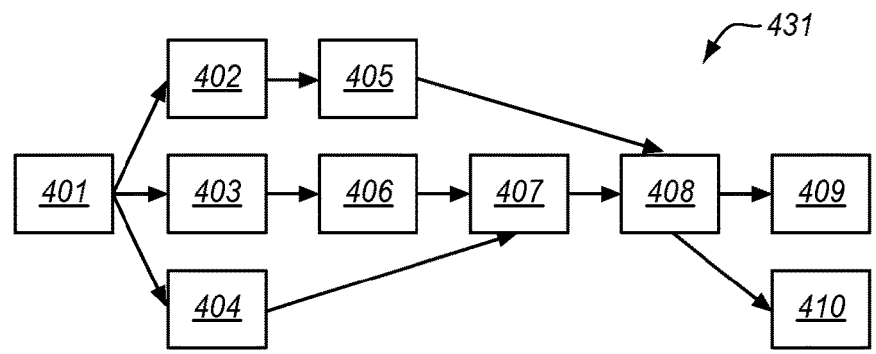
GUI
124

FIG. 9
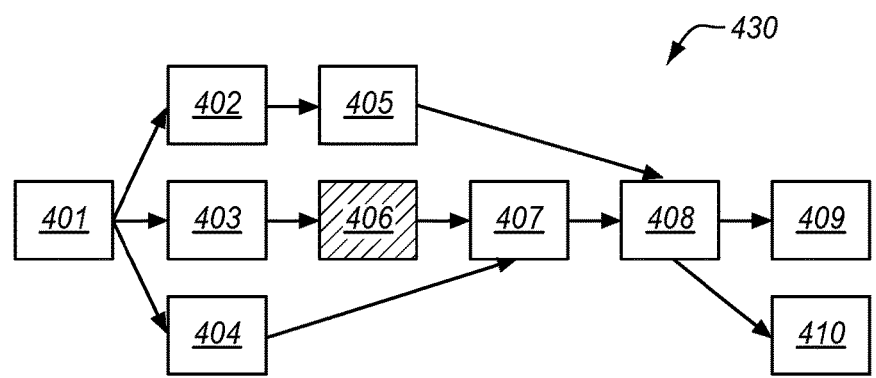
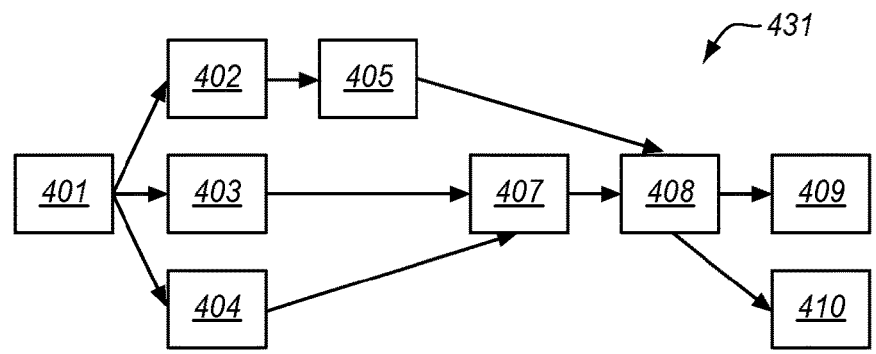
GUI
124

FIG. 10
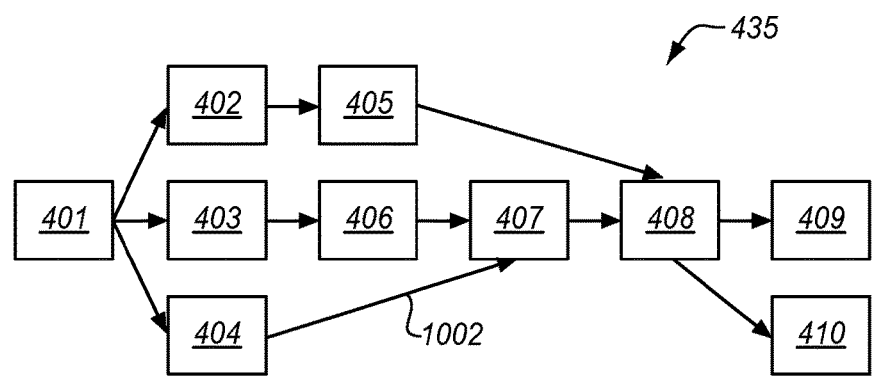
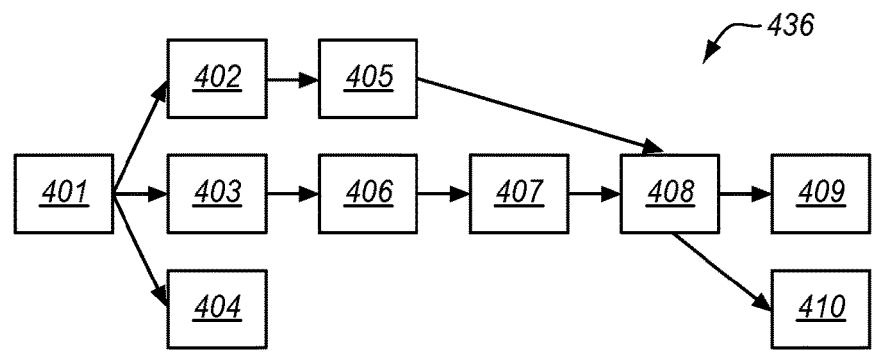
GUI
124

FIG. 11
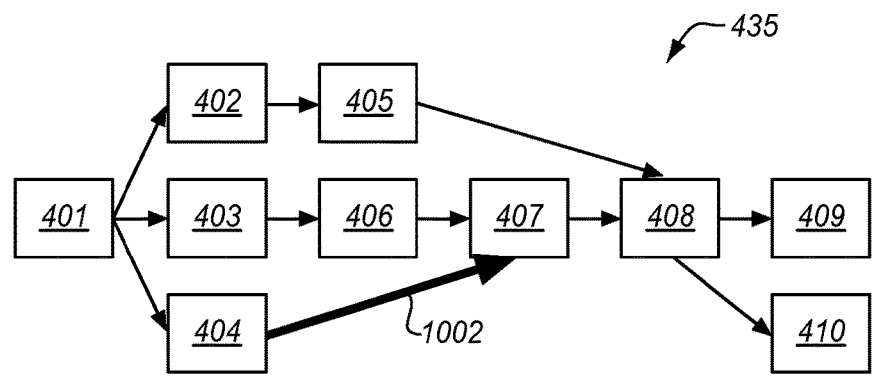
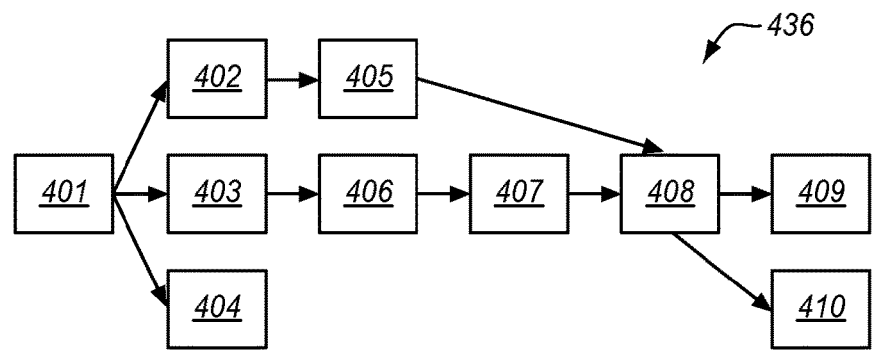
GUI
124

FIG. 12
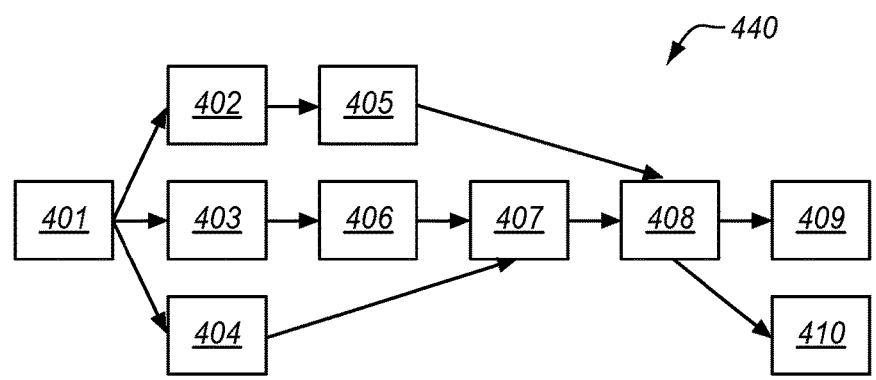
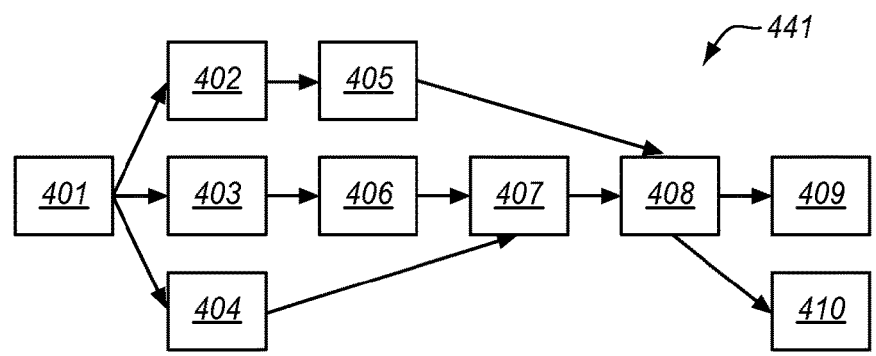
GUI
124

FIG. 13
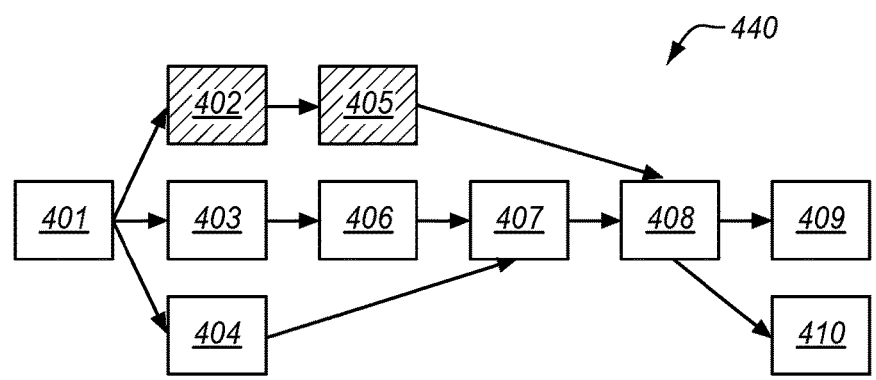
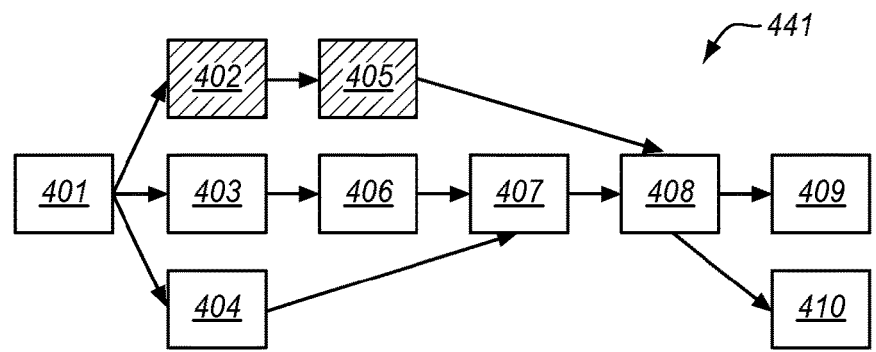
GUI
124

PRINT WORKFLOW VISUALIZATION AND COMPARISON

FIELD

This disclosure relates to the field of printing systems and, in particular, to comparing print workflows.

BACKGROUND

Print shops are typically medium or large-scale facilities capable of supplying printing services to meet a variety of customer demands. For example, print shops are often used to print documents for mass-mailing (e.g., customer bills, advertisements, etcetera). Because print shops engage in printing on a scale that is hard to match, their customer base is usually varied. Print shop clients may therefore include both large institutional clients (e.g., credit card companies and banks), and small clients (e.g., small businesses and churches).

Print shops are generally arranged to print incoming print jobs from clients in a way that is economical, yet fast. Thus, print shops often include a number of high-volume printers capable of printing incoming print jobs quickly and at high quality. These printers may be managed by operators who can remove paper jams and reload the printers with media. Print shops also typically include post-print devices that are used to process the printed documents of each print job (e.g., stackers, staplers, cutters, binders, etc.). Because print shops serve a variety of clients, they are often tasked with handling print jobs that have varying printing formats, delivery dates, and print media requirements. Print shops therefore often use a centralized print server that coordinates the activity between printers of the print shop and the clients. The print server schedules incoming print jobs and forwards them to the printers of the print shop.

Customers with printing needs generate print jobs for the print shop using a variety of tools, such as web interfaces to the print shop, client-side tools operated by the customer, etc. When a customer generates a print job for the print shop, options for the job are selected by the customer and integrated into the print job (e.g., a job ticket for the customer's print data indicates duplexing, print media types, etc.) based on the capabilities and activities that the print shop offers to customers. A print shop administrator then generates a print workflow for the print job. The print workflow includes sequences of steps that identify the print shop activities to perform for the print job. Such steps may include a variety of actions such as printing, stapling, generating billing for the customer, shipping, an email verification process for proof sheets, transforming data from one datastream to another, identifying document boundaries in a continuous print stream, adding barcodes, etc.

In some cases, a print shop administrator may have a desire to determine how two print workflows are different from each other. For instance, a print shop administrator may use a print workflow for an old print job as a template, and make changes to the print workflow for a new print job. In some cases, it may be difficult to determine the differences, in cases where the changes are subtle. For instance, the steps in the two print workflows may be identical, but the properties in the steps are not. Or, the two print workflows may have different steps, which can be difficult to determine when the print workflows are complicated. Thus, it is desirable to ensure that differences between print workflows can be represented to the print shop administrator with clarity and precision.

SUMMARY

Embodiments described herein provide for visually displaying a graphical representation of two or more print workflows to a user with a Graphical User Interface (GUI), analyzing the two or more print workflows to determine the differences between them, and visually displays the differences to the user with the GUI.

One embodiment comprises an apparatus that includes a controller coupled to a display device. The display device presents a GUI to a user. The controller receives a first print workflow and at least one second print workflow, generates a first signal indicative of a first graphical representation of sequences of linked steps of the first print workflow and the at least one second print workflow, and transmits the first signal to the display device. The display device receives the first signal from the controller, and displays the first graphical representation to the user with the GUI as a function of the first signal. The controller determines differences between the first print workflow and the at least one second print workflow, generates a second signal indicative of a second graphical representation of the differences, and transmits the second signal to the display device. The display device receives the second signal from the controller, and displays the second graphical representation to the user with the GUI as a function of the second signal.

Another embodiment comprises a method operable by an apparatus that includes a controller coupled to a display device, where the display device is configured to display a Graphical User Interface (GUI) to a user. The method comprises receiving, by the controller, a first print workflow and at least one second print workflow, generating, by the controller, a first signal indicative of a first graphical representation of sequences of linked steps of the first print workflow and the at least one second print workflow, and transmitting, by the controller, the first signal to the display device. The method further comprises receiving, by the display device, the first signal from the controller, and displaying, by the display device, the first graphical representation to the user with the GUI as a function of the first signal. The method further comprises determining, by the controller, differences between the first print workflow and the at least one second print workflow, generating, by the controller, a second signal indicative of a second graphical representation of the differences, and transmitting, by the controller, the second signal to the display device. The method further comprises receiving, by the display device, the second signal from the controller, and displaying, by the display device, the second graphical representation to the user with the GUI as a function of the second signal.

Another embodiment comprises a tangible computer-readable medium includes programmed instructions which, when executed by one or more processors of an apparatus that includes a controller coupled to a display device, the display device configured to display a Graphical User Interface (GUI) to a user, direct the one or more processors to receive, by the controller, a first print workflow and at least one second print workflow, to generate, by the controller, a first signal indicative of a first graphical representation of sequences of linked steps of the first print workflow and the at least one second print workflow, and transmit, by the controller, the first signal to the display device. The instructions direct the one or more processors to receive, by the display device, the first signal, and to display, by the display device, the first graphical representation to the user with the GUI as a function of the first signal. The instructions further direct the one or more processors to determine, by the controller, differences between the first print workflow and the at least one second print workflow, to generate, by the controller a second signal indicative of the differences, and to transmit, by the controller, the second signal to the display device. The instructions further direct the one or more processors to receive, by the display device, the second signal from the controller, and to display, by the display device, the second graphical representation to the user with the GUI as a function of the second signal.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, and with reference to the accompanying drawings. The same reference number represents the same element or the same type of element on all drawings.

FIGS. 4-13 illustrate different print workflows displayed by a GUI in various illustrative embodiments.

DESCRIPTION OF THE EMBODIMENTS

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
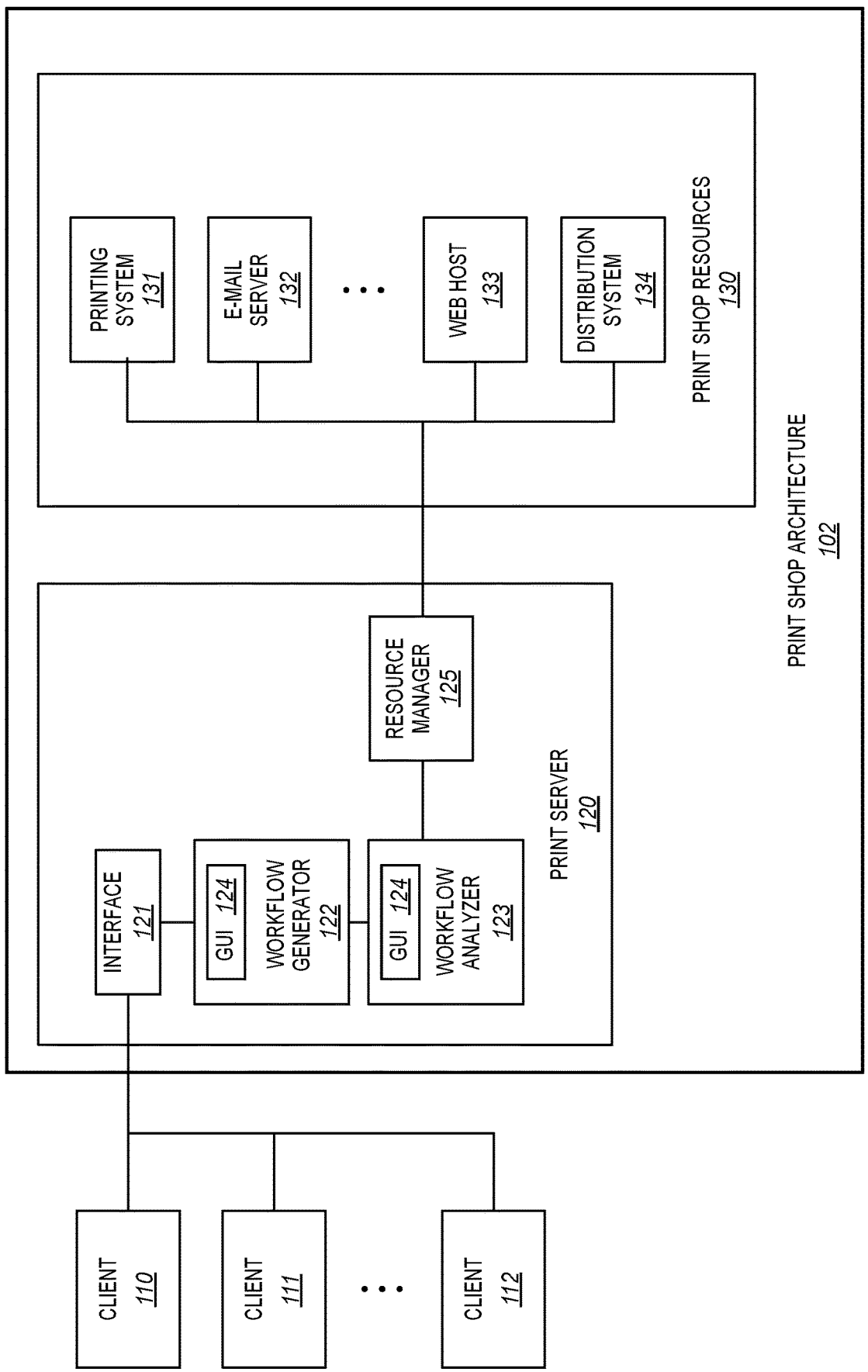
FIG. 1 is a block diagram illustrating a print shop architecture in an illustrative embodiment.

FIG. 1 is a block diagram illustrating a print shop architecture 102 in an illustrative embodiment. Print shop architecture 102 includes a print server 120, which functionally connects one or more clients 110-112 to print shop resources 130. Clients 110-112 may be servers or software applications used by print shop customers. Clients 110-112 submit print data and job tickets that describe how the print data will be processed to interface 121. A print shop administrator utilizes print server 120 to perform an analysis on print workflows to identify differences, and manage print shop resources 130 in accordance with these print workflows. The print workflows are analyzed based on print workflow properties that define the relationships, ranges of values, instances, etc., of steps used to implement the activities that are provided by print shop resources 130.

Clients 110-112 may serve banks, credit card companies, or other customers that have printing and document delivery needs (e.g., monthly bank statements, monthly credit card bills, etc.). Clients 110-112 may also serve customers with digital printing and publishing needs (e.g., needs for e-mail services, web publishing services, and others). Information describing the activities requested by the customer may be included in job tickets sent by clients 110-112.

Print shop resources 130 include the devices and components of the print shop that are used to perform print shop activities. For example, print shop resources 130 may include personnel, printers, post-printing machinery, e-mail or web publishing servers, media, ink, firmware versions for print shop devices, etc. Print shop resources 130 may exist within the confines of the print shop itself, or may comprise off-site devices and functional components managed by print server 120. The print shop resources 131-134 illustrated in FIG. 1 are merely meant to provide an example of the variety of print shop resources 130 that may be provided. For instance, print shop resources 130 may include printing system 131 for transforming print data onto a suitable printable medium, such as paper. Other resources may include e-mail server 132 for generating e-mails, web host 133 for generating and hosting web pages or other internet content, and distribution system 134 for packaging and shipping printed documents.

While in operation, print server 120 identifies the available activities that may be performed by print shop resources 130. Print server 120 may determine the available print shop activities based upon the nature of print shop resources 130. For example, when print shop resources 130 include e-mail server 132, then the available activities may include generating e-mails, scheduling times to send e-mails, and selecting e-mail recipients. The activities may be associated with a category or type of resource (e.g., personnel, printers, servers) and may also be associated with specific named print shop resources (e.g., Susan, printing system 131, e-mail server 132).

Innumerable print shop activities may be available, and certain print shop activities may be logically related with each other so that they have order and dependency relationships (e.g., a post-printing activity such as hole punching depends upon the print data being successfully printed). A print shop administrator may prioritize activities (e.g., to ensure that billing is the last activity performed), and may make certain activities required (e.g., billing may be required for every print job that enters the print shop). Furthermore, certain activities may be required, altered, or made optional based upon specific clients, customers, or information in a job ticket of the print job (e.g., customer service requests, multimedia parameters, size of the print data, format of the print data, print media selected by the customer for the print job, etc.). For example, thank you letters may be sent to high value or long-term customers, while credit checks may be performed upon new customers. In order to aid an operator of the print shop in creating a print workflow for a print job, a Graphical User Interface (GUI) 124 is provided for manipulation of print workflows.

Once the activities that are available at print shop architecture 102 have been determined, an operator utilizes GUI 124 in conjunction with workflow generator 122 to generate a print workflow for a print job. As discussed previously, a print shop administrator may utilize an older print workflow for a previous print job as a template for a new print job. In some cases, the steps, the order of the steps, and many of the properties of the print workflow may be the same for different print jobs. However, typically at least some of the properties of a print workflow will change for different print jobs. For instance, the print media may be different, an email address used to email customers proofs for the print job may be different, a transformation of print data may be needed, a different control file may be needed, and/or a different barcode content or barcode positions may be needed, etc. These differences may be minor enough to escape easy detection by the print shop administrator when the print shop administrator attempts to determine the differences between the different print workflows. For instance, the email address property for a step in the print workflow that utilizes e-mail server 132 may not be visible when the step is graphically illustrated to the print shop administrator. In another example, the print workflow may include a large number of steps, branches, and conditions associated with the branches that is not easily discernable from casually inspecting the graphical representation of the print workflows at GUI 124. In this embodiment, print server 120 provides two or more print workflows to a workflow analyzer 123, which performs an analysis to determine the differences between the print workflows. These differences are then visually presented to the print shop administrator using GUI 124. The print shop administrator is able to quickly and easily identify the difference between the print workflows, making changes to the print workflow that will be used by the new print job. Once the print shop administrator is satisfied with the print workflow, the print workflow is assigned to the new print job and submitted to a resource manager 125.

Resource manager 125 of print server 120 analyzes the print workflow assigned to the print job by the print shop administrator, and directs print shop resources 130 to perform the activities defined by the print workflow for the print job. Resource manager 125 identifies activities that relate to specific print shop resources 131-134 (e.g., the activity "e-mail the client a printing status report" may relate to e-mail server 132), and instructs the specific resources to perform the identified activities. Resource manager 125 may also receive feedback from print shop resources 130 (e.g., information indicating that an activity has successfully completed).

Figure 2:
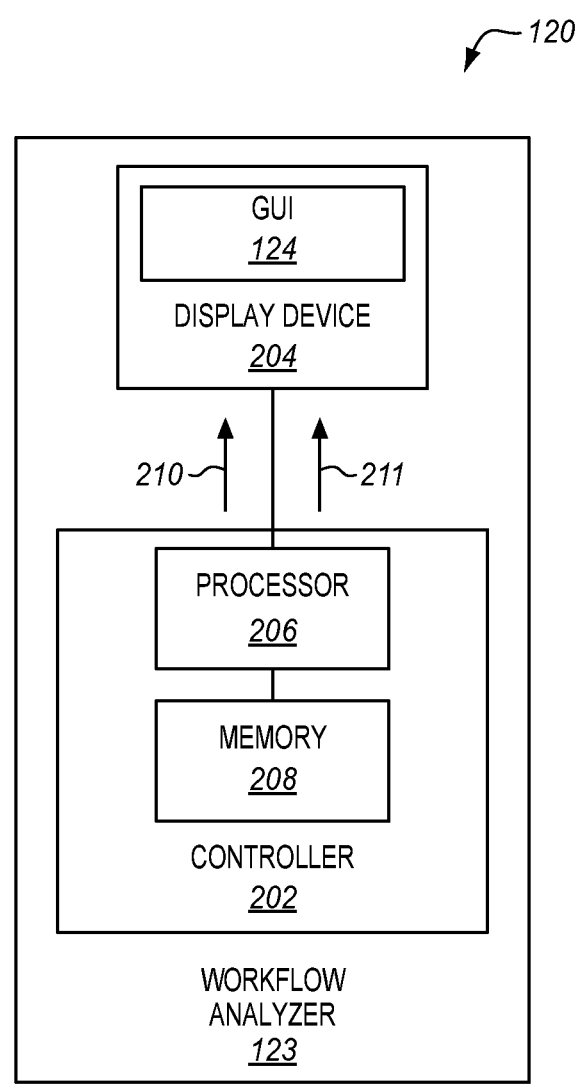
FIG. 2 is a block diagram illustrating additional details for a print server of the architecture of FIG. 1 in an illustrative embodiment.

FIG. 2 is a block diagram illustrating additional details for workflow analyzer 123 of FIG. 1 in an illustrative embodiment. In this embodiment, workflow analyzer 123 includes a controller 202 and a display device 204 that displays GUI 124. Controller 202 and display device 204 includes any physical components, and/or physical systems, and/or physical devices that are capable of implementing the functionality described herein for workflow analyzer 123. While the specific physical implementation of controller 202 is subject to design choices, one particular embodiment may include one or more processors 206 coupled with a memory 208. Processor 206 includes any electronic circuits and/or optical circuits that are able to perform functions. The term "circuits" used herein refers to a physical implementation of hardware that is capable of performing the described functionality. Processor 206 may include one or more Central Processing Units (CPU), microprocessors, Digital Signal Processors (DSPs), Application-specific Integrated Circuits (ASICs), Programmable Logic Devices (PLDs), Field-Programmable Gate Arrays (FPGA), etc. Some examples of processors include INTEL® CORE™ processors, Advanced Risk Machines (ARM®) processors, etc.

Memory 208 includes any electronic circuits and/or optical circuits and/or magnetic circuits that are able to store data. For instance, memory 208 may store information regarding the print workflows under comparison, which may then be used by processor 206 to determine the differences between the print workflows. Memory 208 may include one or more volatile or non-volatile Dynamic Random-Access Memory (DRAM) devices, FLASH devices, volatile or non-volatile Static RAM devices, hard drives, Solid State Disks (SSDs), shift registers, etc. Some examples of non-volatile DRAM and SRAM include battery-backed DRAM and battery-backed SRAM.

In this embodiment, consider that client 110 generates a print job for print shop architecture 102, and transmits the print job to interface 121 of print server 120. Utilizing GUI 124, a print shop administrator interacts with workflow generator 122 to generate a new print workflow for the customer's job. The print workflow includes steps that identify the print shop activities to perform for the print job. For example, the steps may indicate a preflight activity for the print job, customer credit verification, printing, post-print activity for the print job (e.g., stapling, binding, mailing, shipping, etc.). Upon generating the new print workflow, the print shop administrator may wish to compare the new print workflow with a different print workflow to determine the differences between them.

Figure 3:
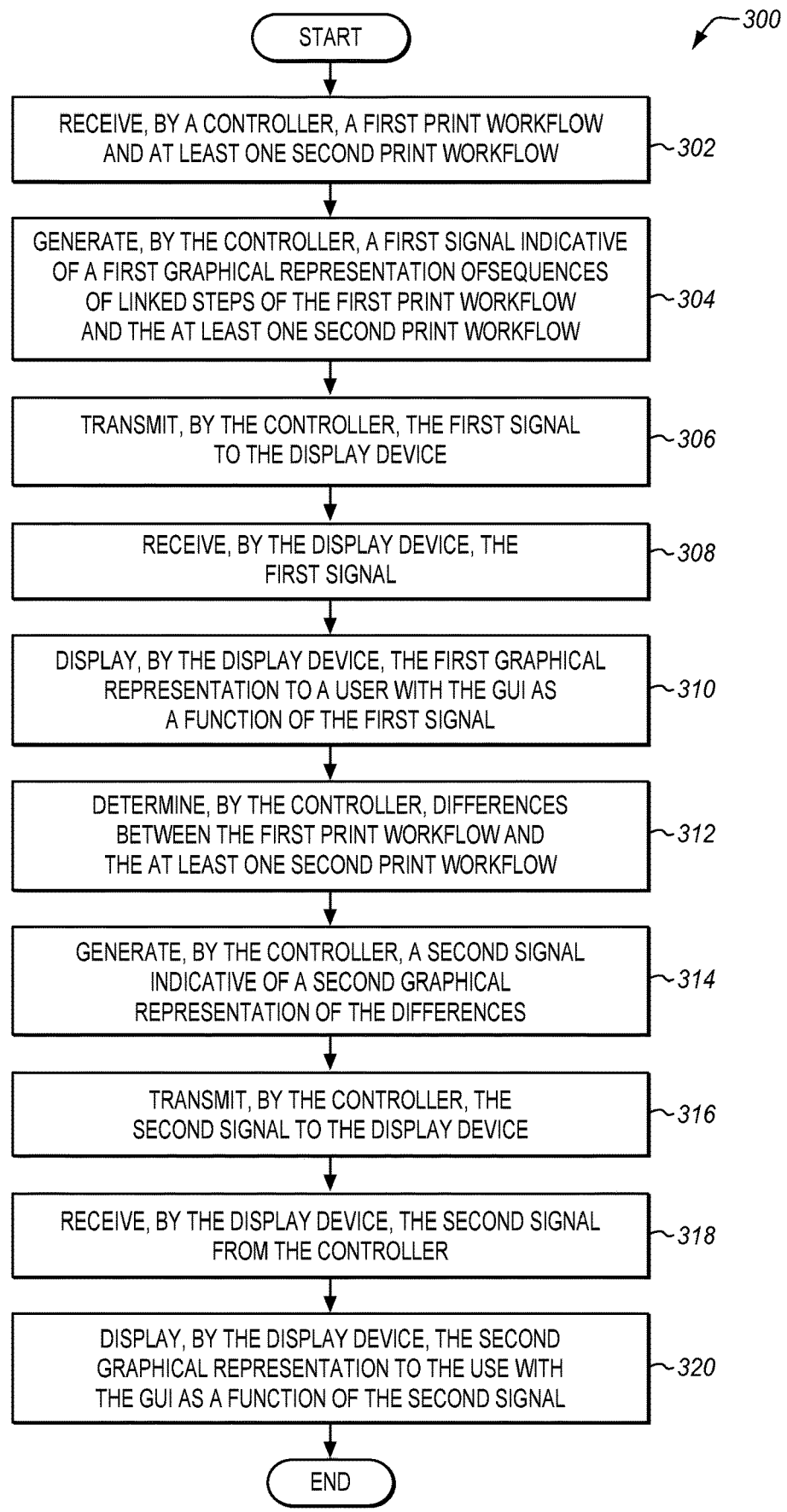
FIG. 3 is a flow chart illustrating a method of analyzing the differences between two print workflows in an illustrative embodiment.

FIG. 3 is a flow chart illustrating a method 300 of comparing print workflows in an illustrative embodiment. The steps of method 300 will be described with respect to controller 202 and display device 204 of FIG. 2, although one skilled in the art will understand that method 300 may be performed by other systems not shown. The steps of the method described herein are not all inclusive and may include other steps not shown. The steps may also be performed in an alternative order.

To begin a process of comparing different print workflows (e.g., comparing a first print workflow with a second print workflow), controller 202 receives two or more print workflows (see step 302). Controller 202 generates a first signal 210 indicative of a first graphical representation of sequences of linked steps of the print workflows (see FIG. 2 and step 304 of FIG. 3). The first graphical representation comprises any visual indications that allow a user to identify the steps in different print workflows. For instance, steps in the print workflows may be represented by boxes, with links between steps in the print workflows represented by arrows between the boxes. Controller 202 transmits first signal 210 to display device 204 (see step 306). Display device 204 receives first signal 210 (see step 308), which displays the first graphical representation of the print workflows to the user with GUI 124 as a function of first signal 210 (see step 310).

Figure 5:
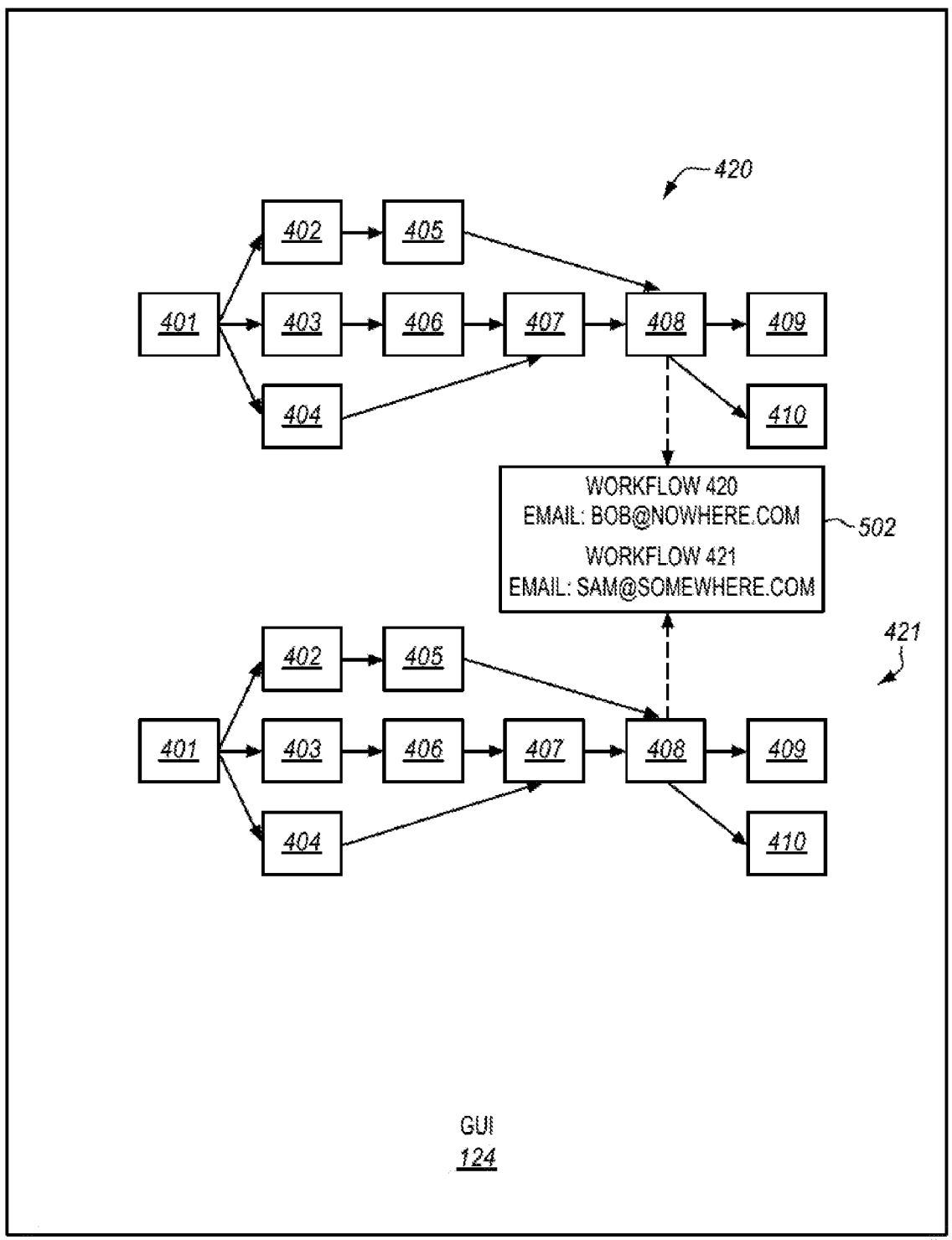

FIGS. 4-5 illustrate two print workflows 420-421 displayed by GUI 124 in an illustrative embodiment. Although only two print workflows 420-421 are described for comparison, a print workflow may be compared with any number of print workflows. Generally, FIG. 4 may be considered as representative of one particular implementation of the first graphical representation of print workflows 420-421, while FIG. 5 may be considered as representative of one particular implementation of the second graphical representation of print workflows 420-421.

In FIG. 4, print workflows 420-421 are similar to each other, but not identical. In particular, while both print workflows 420-421 include steps 401-410, a property of step 408 between print workflows 420-421 is different. For instance, step 408 may comprise a process to send an email to the customer with proofs of the print job. However, the email address between different customers is typically not the same. When comparing different print workflows, it is not easy to determine this difference without some visual clue. Controller 202 analyzes print workflows 420-421, and determines the differences between print workflows 420-421 (see step 312). For instance, print workflows 420-421 may be represented in a database by Extensible Markup Language (XML) data. The XML data may include various fields that define the properties and steps for print workflows 420-421. To determine the differences between print workflows 420-421, controller 202 may identify an XML entry in a database (not shown) associated with the email address property value for step 408 of print workflow 420, and compare it with the corresponding XML entry in the database associated with the email property value for step 408 of print workflow 421. In response to determining a difference between the property values in step 408 for print workflows 420-421, controller 202 generates a second signal 211 indicative of a second graphical representation of the differences (see FIG. 2 and step 314 of FIG. 3), and transmits second signal 211 to display device 204 (see step 316). Display device 204 receives second signal 211 (see step 318), and displays the second graphical representation to the user with GUI 124 as a function of second signal 211 (see step 320).

FIG. 5 illustrates one possible implementation of visually displaying the differences between print workflows 420-421 in an illustrative embodiment. In particular, an alert box 502 displays the different property values for the email address field of step 408 for print workflows 420-421.

Figure 7:
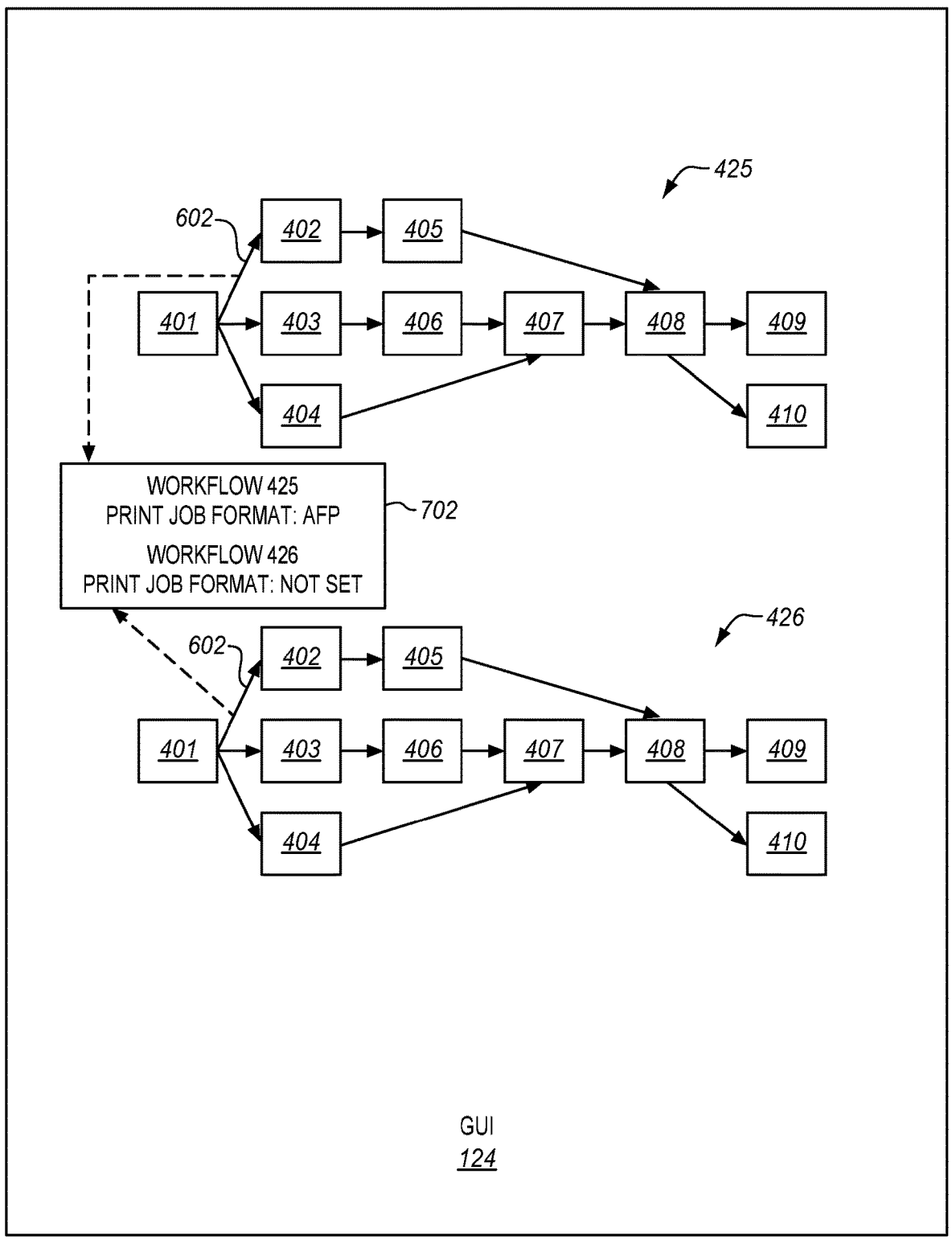

FIGS. 6-7 illustrate two print workflows 425-426 displayed by GUI 124 in another illustrative embodiment. In FIG. 6, print workflows 425-426 are similar to each other, but not identical. In particular, while both print workflows 425-426 include steps 401-410, a property value of a branching condition 602 between steps 401-402 is different in this embodiment. For instance, branching condition 602 in print workflow 425 may be set to execute step 404 when the print job is formatted as an Advanced Function Presentation (AFP) print job. However, determining if the branching condition 602 for print workflow 426 is the same may be difficult to determine without manually investigating various property field windows for print workflow 426. To determine the differences between print workflows 425-426, controller 202 may identify an XML entry associated with branching condition 602 of print workflow 425, and compare it with the corresponding XML entry associated with branching condition 602 of print workflow 426. In response to controller 202 determining a difference between the property values for branching condition 602, display device 204 visually displays the differences to the user with GUI 124. FIG. 7 illustrates one possible implementation of visually displaying the differences between print workflows 425-426 in an illustrative embodiment. In particular, an alert box 702 displays the different property values for branching condition 602 for print workflows 425-426. Generally, FIG. 6 may be considered as representative of one particular implementation of the first graphical representation of print workflows 425-426, while FIG. 7 may be considered as representative of one particular implementation of the second graphical representation of print workflows 425-426.

FIGS. 8-9 illustrate two print workflows 430-431 displayed by GUI 124 in another illustrative embodiment. In FIG. 8, print workflows 430-431 are similar to each other, but not identical. In particular, while print workflow 430 include steps 401-410, step 406 is missing from print workflow 431. To determine the differences between print workflows 430-431, controller 202 may identify XML entries that identify the steps in print workflow 430, and compare the entries with the corresponding XML entries that identify the steps in print workflow 431. In response to controller 202 determining a difference between the steps in print workflows 430-431, display 204 visually displays the differences to the user with GUI 124. FIG. 9 illustrates one possible implementation of visually displaying the differences between print workflows 430-431 in an illustrative embodiment. In particular, step 406 in print workflow 430 is highlighted to indicate that step 406 is missing from print workflow 431. Generally, FIG. 8 may be considered as representative of one particular implementation of the first graphical representation of print workflows 430-431, while FIG. 9 may be considered as representative of one particular implementation of the second graphical representation of print workflows 430-431.

FIGS. 10-11 illustrate two print workflows 435-436 displayed by GUI 124 in another illustrative embodiment. In FIG. 10, print workflows 435-436 are similar to each other, but not identical. In particular, while print workflow 435 includes a branch 1002 that is not present in print workflow 436. To determine the differences between print workflows 430-431, controller 202 may identify XML entries that identify the branches in print workflow 435, and compare the entries with the corresponding XML entries that identify the branches in print workflow 436. In response to controller 202 determining a difference between the steps in print workflows 435-436, display 204 visually displays the differences to the user with GUI 124. FIG. 11 illustrates one possible implementation of visually displaying the differences between print workflows 435-436 in an illustrative embodiment. In particular, branch 1002 in print workflow 435 is highlighted to indicate that branch 1002 is missing from print workflow 436. Generally, FIG. 10 may be considered as representative of one particular implementation of the first graphical representation of print workflows 435-436, while FIG. 11 may be considered as representative of one particular implementation of the second graphical representation of print workflows 435-436.

FIGS. 12-13 illustrate two print workflows 440-441 displayed by GUI 124 in another illustrative embodiment. In FIG. 12, print workflows 440-441 are similar to each other, but not identical. In particular, steps 402 and 405 in print workflow 440 are linked in a different order as compared to print workflow 441. To determine the differences between print workflows 440-441, controller 202 may identify XML entries that identify how the steps are linked in print workflow 440, and compare the entries with the corresponding XML, entries that identify how the steps are linked in print workflow 441. In response to controller 202 determining a difference between the steps in print workflows 440-441, display device 204 visually displays the differences to the user with GUI 124. FIG. 13 illustrates one possible implementation of visually displaying the differences between print workflows 440-441 in an illustrative embodiment. In particular, steps 402 and 405 in print workflow 440 are highlighted to indicate that steps 402 and 405 are linked in a different order as compared to print workflow 441. Generally, FIG. 12 may be considered as representative of one particular implementation of the first graphical representation of print workflows 440-441, while FIG. 13 may be considered as representative of one particular implementation of the second graphical representation of print workflows 440-441.

The embodiments described herein allow for a print shop administrator to compare different print workflows and quickly identify the differences between the print workflow using visual clues. The use of visual clues reduces the amount of effort that it may take to manually identify the differences, which improves the efficiency of the print shop.

Figure 14:
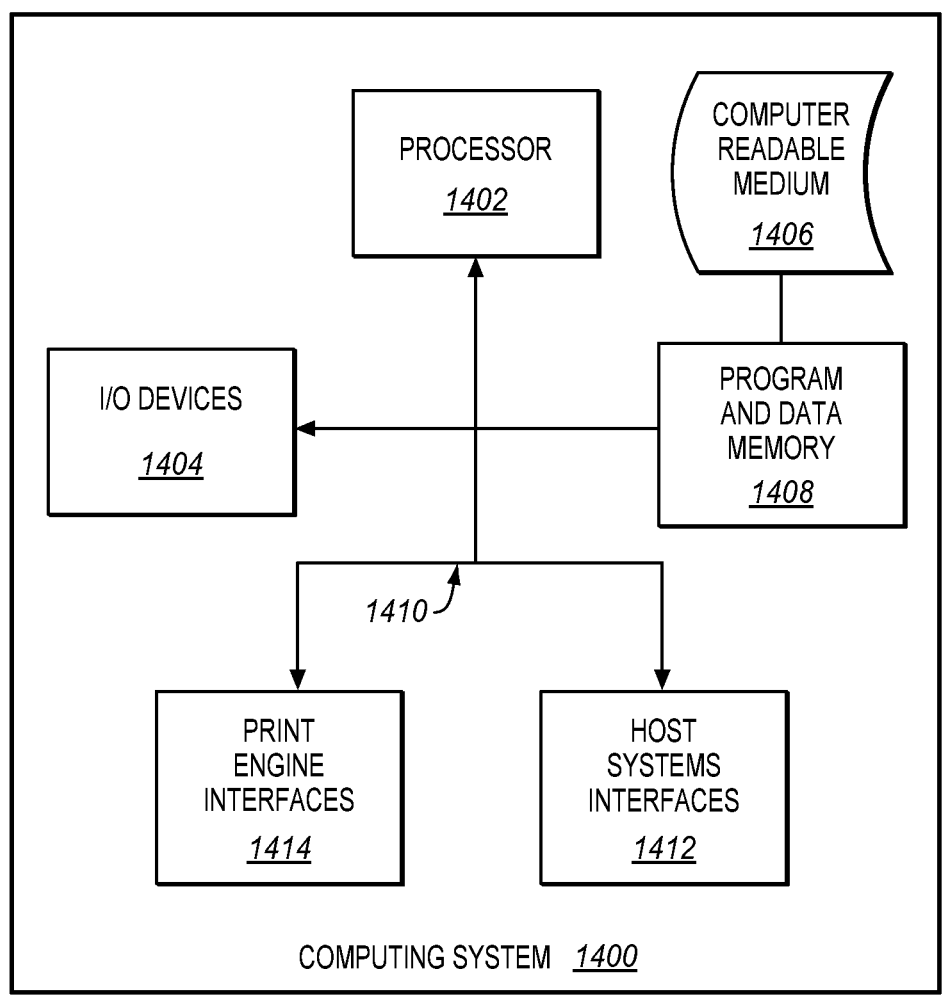
FIG. 14 is a block diagram illustrating a computer system operable to execute computer readable medium embodying programmed instructions to perform desired functions in an exemplary embodiment.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 14 illustrates a computing system 1400 in which a computer-readable medium 1406 may provide instructions for performing method 300 in an exemplary embodiment.

Furthermore, the invention can take the form of a computer program product accessible from a computer-usable or computer-readable medium 1406 providing program code for use by or in connection with a computer or any instruction execution system. For the purposes of this description, a computer-usable or computer-readable medium 1406 can be any apparatus that can contain, store, communicate, propagate, or transport the program for use by or in connection with the instruction execution system, apparatus, or device.

The computer-readable medium 1406 can be an electronic, magnetic, optical, electromagnetic, infrared, or semiconductor system (or apparatus or device) or a propagation medium. Examples of a computer-readable medium 1406 include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code includes at least one processor 1402 coupled directly or indirectly to memory 1408 through a system bus 1410. The memory 1408 can include local memory employed during actual execution of the program code, bulk storage, and cache memories which provide temporary storage of at least some program code in order to reduce the number of times code is retrieved from bulk storage during execution.

Input/output or I/O devices 1404 (including but not limited to keyboards, displays, pointing devices, etc.) can be coupled to the system either directly or through intervening I/O controllers.

Network adapters may also be coupled to the system to enable the data processing system to become coupled to other data processing systems, such a through host systems interfaces 1412, or remote printers or storage devices through intervening private or public networks, such as through print engine interfaces 1414. Modems, cable modem and Ethernet cards are just a few of the currently available types of network adapters.

Although specific embodiments were described herein, the scope of the invention is not limited to those specific embodiments. The scope of the invention is defined by the following claims and any equivalents thereof.

What is claimed is:

1. An apparatus, comprising:
a display device configured to present a Graphical User Interface (GUI) to a user; and
a controller coupled to the display device, the controller configured to receive a first print workflow and at least one second print workflow, to generate a first signal indicative of a first graphical representation of sequences of linked steps of the first print workflow and the at least one second print workflow, and to transmit the first signal to the display device,
wherein the display device is configured to receive the first signal from the controller, and to display the first graphical representation to the user with the GUI as a function of the first signal,
wherein the controller is configured to determine differences between the first print workflow and the at least one second print workflow by identifying a first value of an invisible property in a step in the first print workflow that does not match a second value of the invisible property in a corresponding step in the at least one second print workflow,
wherein the controller is configured to generate a second signal indicative of a second graphical representation of the differences, wherein the second graphical representation visually displays simultaneously the previously invisible first value of the invisible property of the step in the first print workflow and the previously invisible second value of the invisible property of the corresponding step in the at least one second print workflow, and to transmit the second signal to the display device,
wherein the display device is configured to receive the second signal from the controller, and to display simultaneously to the user with the GUI, both of: the first graphical representation of sequences of linked steps of the first print workflow and the at least one second print workflow as a function of the first signal, and the second graphical representation of the differences between the first print workflow and the at least one second print workflow as a function of the second signal, the second graphical representation being visually different than the first graphical representation.

2. The apparatus of claim 1, wherein:
the controller is configured to determine the differences by identifying steps in the first print workflow that are not present in the at least one second print workflow.

3. The apparatus of claim 1, wherein:
the controller is configured to determine the differences by identifying branches in the first print workflow that are not present in the at least one second print workflow.

4. The apparatus of claim 1, wherein:
the controller is configured to determine the differences by identifying a branching condition for a branch in the first print workflow that does not match the branching condition for the branch in the at least one second print workflow.

5. The apparatus of claim 1, wherein:
the controller is configured to analyze steps, properties for the steps, branches, and branching conditions in each of the first print workflow and the at least one second print workflow, and to determine the differences by identifying at least one of the steps, property for the steps, branches, and branching conditions in the first print workflow that is different than the at least one second print workflow.

6. The apparatus of claim 1, wherein:
the controller is configured to determine the differences by identifying steps in the first print workflow that are linked in a different order in the at least one second print workflow.

7. The apparatus of claim 1, wherein:
the second graphical representation visually displays the previously invisible first value of the invisible property and also identifies the step in the first print workflow associated with the first value, and the second graphical representation visually displays the previously invisible second value of the invisible property and also identifies the corresponding step in the at least one second print workflow associated with the second value.

8. A method operable by an apparatus that includes a controller coupled to a display device, the display device configured to display a Graphical User Interface (GUI) to a user, the method comprising:
receiving, by the controller, a first print workflow and at least one second print workflow;
generating, by the controller, a first signal indicative of a first graphical representation of sequences of linked steps of the first print workflow and the at least one second print workflow;
transmitting, by the controller, the first signal to the display device;
receiving, by the display device, the first signal from the controller;
displaying, by the display device, the first graphical representation to a user with the GUI as a function of the first signal;
determining, by the controller, differences between the first print workflow and the at least one second print workflow by identifying a first value of an invisible property in a step in the first print workflow that does not match a second value of the invisible property in a corresponding step in the at least one second print workflow;
generating, by the controller, a second signal indicative of a second graphical representation of the differences, wherein the second graphical representation visually displays simultaneously the previously invisible first value of the invisible property of the step in the first print workflow and the previously invisible second value of the invisible property of the corresponding step in the at least one second print workflow;
transmitting, by the controller, the second signal to the display device;
receiving, by the display device, the second signal from the controller; and
displaying, by the display device, simultaneously to the user with the GUI, both of: the first graphical representation of sequences of linked steps of the first print workflow and the at least one second print workflow as a function of the first signal, and the second graphical representation of the differences between the first print workflow and the at least one second print workflow as a function of the second signal, the second graphical representation being visually different than the first graphical representation.

9. The method of claim 8, wherein determining the differences further comprises:
identifying steps in the first print workflow that are not present in the at least one second print workflow.

10. The method of claim 8, wherein determining the differences further comprises:
identifying branches in the first print workflow that are not present in the at least one second print workflow.

11. The method of claim 8, wherein determining the differences further comprises:
identifying a branching condition for a branch in the first print workflow that does not match the branching condition for the branch in the at least one second print workflow.

12. The method of claim 8, wherein determining the differences further comprises:
analyzing steps, properties for the steps, branches, and branching conditions in each of the first print workflow and the at least one second print workflow; and
identifying at least one of the steps, property for the steps, branches, and branching conditions in the first print workflow that is different than the at least one second print workflow.

13. The method of claim 8, wherein determining the differences further comprises:
identifying steps in the first print workflow that are linked in a different order in the at least one second print workflow.

14. The method of claim 8, wherein:
the second graphical representation visually displays the previously invisible first value of the invisible property and also identifies the step in the first print workflow associated with the first value, and
the second graphical representation visually displays the previously invisible second value of the invisible property and also identifies the corresponding step in the at least one second print workflow associated with the second value.

15. A non-transitory computer-readable medium including programmed instructions which, when executed by one or more processors of an apparatus that includes a controller coupled to a display device, the display device configured to display a Graphical User Interface (GUI) to a user, direct the one or more processors to:
receive, by the controller, a first print workflow and at least one second print workflow;
generate, by the controller, a first signal indicative of a first graphical representation of sequences of linked steps of the first print workflow and the at least one second print workflow;
transmit, by the controller, the first signal to the display device;
receive, by the display device, the first signal from the controller;
display, by the display device, the first graphical representation to a user with the GUI as a function of the first signal;
determine, by the controller, differences between the first print workflow and the at least one second print workflow by identifying a first value of an invisible property in a step in the first print workflow that does not match a second value of the invisible property in a corresponding step in the at least one second print workflow;
generate, by the controller, a second signal indicative of a second graphical representation of the differences, wherein the second graphical representation visually displays simultaneously the previously invisible first value of the invisible property of the step in the first print workflow and the previously invisible second value of the invisible property of the corresponding step in the at least one second print workflow;
transmit, by the controller, the second signal to the display device;
receive, by the display device, the second signal from the controller; and
display, by the display device, simultaneously to the user with the GUI, both of: the first graphical representation of sequences of linked steps of the first print workflow and the at least one second print workflow as a function of the first signal, and the second graphical representation of the differences between the first print workflow and the at least one second print workflow as a function of the second signal, the second graphical representation being visually different than the first graphical representation.

16. The non-transitory computer-readable medium of claim 15, wherein the programmed instructions further direct the one or more processors to:
determine the differences by identifying steps in the first print workflow that are not present in the at least one second print workflow.

17. The non-transitory computer-readable medium of claim 15, wherein the programmed instructions further direct the one or more processor to:
determine the differences by identifying branches in the first print workflow that are not present in the at least one second print workflow.

18. The non-transitory computer-readable medium of claim 15, wherein the programmed instructions further direct the one or more processor to:
determine the differences by identifying a branching condition for a branch in the first print workflow that does not match the branching condition for the branch in the at least one second print workflow.

19. The non-transitory computer-readable medium of claim 15, wherein the programmed instructions to determine the differences further direct the one or more processor to:
analyze steps, properties for the steps, branches, and branching conditions in each of the first print workflow and the at least one second print workflow; and
identify at least one of the steps, property for the steps, branches, and branching conditions in the first print workflow that is different than the at least one second print workflow.

20. The non-transitory computer-readable medium of claim 15, wherein the programmed instructions further direct the one or more processor to:
determine the differences by identifying steps in the first print workflow that are linked in a different order in the at least one second print workflow.

21. The non-transitory computer readable medium of claim 15, wherein:
the second graphical representation visually displays the previously invisible first value of the invisible property and also identifies the step in the first print workflow associated with the first value, and
the second graphical representation visually displays the previously invisible second value of the invisible property and also identifies the corresponding step in the at least one second print workflow associated with the second value.

* * * * *